United States Patent
Ku

(10) Patent No.: US 8,571,015 B2
(45) Date of Patent: *Oct. 29, 2013

(54) METHODS, SYSTEMS, AND COMPUTER PROGRAM PRODUCTS FOR ENABLING NON-IMS QUERIES OF A COMMON TELEPHONE NUMBER MAPPING SYSTEM

(75) Inventor: Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 265 days.

This patent is subject to a terminal disclaimer.

(21) Appl. No.: 13/080,140

(22) Filed: Apr. 5, 2011

(65) Prior Publication Data
US 2011/0182287 A1    Jul. 28, 2011

Related U.S. Application Data

(63) Continuation of application No. 12/336,975, filed on Dec. 17, 2008.

(51) Int. Cl.
H04L 12/66    (2006.01)

(52) U.S. Cl.
USPC ...... 370/352; 370/401; 370/466; 379/201.01; 455/414.1

(58) Field of Classification Search
None
See application file for complete search history.

(56) References Cited

U.S. PATENT DOCUMENTS

| | | | |
|---|---|---|---|
| 6,674,745 B1 * | 1/2004 | Schuster et al. | 370/352 |
| 6,873,849 B2 | 3/2005 | de la Red et al. | |
| 7,529,231 B2 | 5/2009 | Soo et al. | 370/352 |
| 7,624,417 B2 | 11/2009 | Dua | |
| 7,787,445 B2 | 8/2010 | Marsico | |
| 7,933,392 B1 * | 4/2011 | Hannan et al. | 379/111 |
| 7,944,912 B2 | 5/2011 | Kobayashi et al. | |
| 7,948,967 B2 * | 5/2011 | Ku | 370/351 |
| 7,969,967 B2 | 6/2011 | Douglas et al. | |
| 7,974,295 B2 | 7/2011 | Tuohino et al. | |
| 8,184,798 B2 | 5/2012 | Wiatrowski et al. | |
| 8,358,768 B2 | 1/2013 | Heinze et al. | |

(Continued)

FOREIGN PATENT DOCUMENTS

JP    2007-243564 A    9/2007

OTHER PUBLICATIONS

Lind, "ENUM Overview", CC1 ENUM LLC PETPAC, 6 pages, Jun. 13, 2006.

(Continued)

*Primary Examiner* — Chi Pham
*Assistant Examiner* — Shick Hom
(74) *Attorney, Agent, or Firm* — Myers Bigel Sibley & Sajovec, P.A.

(57) ABSTRACT

Methods of routing a non-IP multimedia subsystem (IMS) message from a first user terminal that has telecommunications service provided by a first carrier to a second user terminal that has telecommunications service provided by a second carrier are provided. Pursuant to these methods, a first telephone number mapping (ENUM) database is queried to identify an address of a second ENUM database that is operated by the second carrier. The identified address is used to query the second ENUM database. Routing information for the non-IMS message is received from the second ENUM database in response to the query to the second ENUM database. The non-IMS message may then be routed to the second user terminal based on the routing information received from the second ENUM database. Related systems and computer program products are also provided.

11 Claims, 12 Drawing Sheets

(56) References Cited

U.S. PATENT DOCUMENTS

| | | |
|---|---|---|
| 8,401,161 B2 | 3/2013 | Terpstra et al. |
| 8,432,923 B2 | 4/2013 | Ku |
| 2004/0246965 A1 | 12/2004 | Westman et al. |
| 2005/0286531 A1 | 12/2005 | Tuohino et al. ............ 370/395.2 |
| 2006/0094407 A1* | 5/2006 | Karaoguz et al. .......... 455/414.1 |
| 2006/0140200 A1 | 6/2006 | Black et al. |
| 2006/0206504 A1 | 9/2006 | Cai et al. ....................... 707/100 |
| 2007/0061397 A1 | 3/2007 | Gregorat et al. |
| 2007/0133574 A1 | 6/2007 | Tejani et al. |
| 2007/0165613 A1 | 7/2007 | Soo et al. |
| 2007/0286379 A1 | 12/2007 | Wiatrowski et al. |
| 2008/0002665 A1 | 1/2008 | Soo et al. |
| 2008/0019356 A1 | 1/2008 | Marsico ......................... 370/352 |
| 2008/0025492 A1 | 1/2008 | Heinze et al. ............ 379/220.01 |
| 2008/0130856 A1* | 6/2008 | Ku et al. .................. 379/201.01 |
| 2008/0198997 A1 | 8/2008 | Sterman et al. |
| 2008/0304495 A1 | 12/2008 | Jackson et al. ................ 370/401 |
| 2008/0317000 A1 | 12/2008 | Jackson ......................... 370/352 |
| 2009/0225744 A1 | 9/2009 | Zerillo .......................... 370/352 |
| 2009/0227276 A1 | 9/2009 | Agarwal et al. |
| 2010/0091975 A1 | 4/2010 | Sheth et al. .............. 379/220.01 |
| 2010/0158201 A1 | 6/2010 | Vijay Marathe et al. |
| 2010/0158229 A1 | 6/2010 | Ku |
| 2010/0246444 A1 | 9/2010 | Witzel et al. .................. 370/255 |
| 2011/0038468 A1 | 2/2011 | Hannan et al. |
| 2011/0149956 A1 | 6/2011 | Alt et al. |

OTHER PUBLICATIONS

Wikipdia, the free encyclopedia, "Telephone Number Mapping", en.wikipedia.org/wiki/Telephone_Number_Mapping, 7 pages, Last Downloaded: Oct. 17, 2008.

Fallstrom, "E.164 number and DNS", Network Working Group, Cisco Systems, Inc. (Sep. 2000), 10 pages, ietf.org/rfc/rfc2916.txt, Last Downloaded: Oct. 20, 2008.

Wikipedia, the free encyclopedia, "Voice peering", en.wikipedia.org/wiki/Voice_peering, 1 page, Last Downloaded: Oct. 20, 2008.

Stastny et al., "ENUM—The bridge between telephony and Internet", Eurescom mess@ge, eurescom.de/message/messageSep2004/ENUM_The_bridge_between_telephony_and_Internet, 4 pages, Last Downloaded: Oct. 20, 2008.

Höneisen et al., "SWITCH (The Swiss Education & Research Network)—Hitchhikers Guide to ENUM Services—ENUM Beyond SIP", Version 1.0, 13 pages (2005).

* cited by examiner

METHODS, SYSTEMS, AND COMPUTER PROGRAM PRODUCTS FOR ENABLING NON-IMS QUERIES OF A COMMON TELEPHONE NUMBER MAPPING SYSTEM

RELATED APPLICATIONS

The present application is a continuation of U.S. application Ser. No. 12/336,975, entitled "METHODS, SYSTEMS, AND COMPUTER PROGRAM PRODUCTS FOR ENABLING NON-IMS QUERIES OF A COMMON TELEPHONE NUMBER MAPPING SYSTEM" filed on Dec. 17, 2008 which is related to co-pending and commonly assigned U.S. application Ser. No. 12/338,273, entitled "METHODS, SYSTEMS, AND COMPUTER PROGRAM PRODUCTS FOR PROVIDING INTER-CARRIER IP-BASED CONNECTIONS USING A COMMON TELEPHONE NUMBER MAPPING ARCHITECTURE" filed on Dec. 18, 2008, and to co-pending and commonly assigned U.S. application Ser. No. 12/338,259, entitled "METHODS, SYSTEMS, AND COMPUTER PROGRAM PRODUCTS FOR PROVIDING INTRA-CARRIER IP-BASED CONNECTIONS USING A COMMON TELEPHONE NUMBER MAPPING ARCHITECTURE" filed on Dec. 18, 2008, the disclosures of both of which are incorporated herein by reference.

BACKGROUND

The present disclosure relates to communications networks, and, more particularly, to routing IP-based communications between different network carriers.

Historically, voice telephone calls have been carried over circuit-switched telephone networks, such as the Public Switched Telephone Network (PSTN). The PSTN was originally designed to carry voice traffic over switched analog lines. While the backbone transmission network of the PSTN is now digital, analog circuits are still used to connect analog telephones to the PSTN. The PSTN is largely governed by technical standards created by the Telecommunication Standardization Sector of the International Telecommunication Union (ITU-T), and uses the well known E.164 addressing scheme. An E.164 telephone number has a ten-digit format (NPA-NXX-XXXX) including a three digit numbering plan area code (NPA), or area code for short, followed by a three digit exchange code (NXX) and a four digit station code (XXXX). With circuit-switched telephony, when a telephone number is dialed on a PSTN-connected telephone, a dedicated circuit is set up between the calling terminal and the called terminal, and voice communications are carried out using this dedicated circuit.

Although circuit-switched telephony is still in widespread use, a significant number of telephone calls are now being carried via packet-switched networks, such as networks that utilize the Internet Protocol (IP), which is the basic transmission protocol used for Internet communications. Voice-Over-Internet-Protocol (VoIP) is an industry standard that has evolved to enable users to place phone calls through a packet-switched network, such as the Internet, instead of through the PSTN. With VoIP, a voice signal is digitized and encoded into data packets, which are sent over a packet switched data communications network to a destination address. The packets are reassembled at the receiving terminal (e.g., telephone), and data in the packets is used to reconstruct the voice signal encoded therein. In contrast to a circuit-switched network, the packets in a packet-switched network may follow different paths from the originating terminal to the receiving terminal.

A conventional analog telephone may be connected to the Internet using an interface device that converts analog phone signals to digital signals. These digital signals may then be packetized and communicated over the Internet to a VoIP provider that converts the call back to an analog signal and places the call through a PSTN that is local to the called terminal. Alternatively, the VoIP provider can process the call entirely in digital form if the called terminal/telephone is also a VoIP phone. A user can thereby dial a telephone number in a conventional manner and have the call routed partly or entirely through the Internet, instead of through the PSTN. Similarly, an analog telephone can place a call to a VoIP telephone. The telephone call is routed through the PSTN to the VoIP provider, which converts the call into a digital signal, packetizes the digital information and transmits the packets to the called VoIP telephone.

Furthermore, some telephone carriers have converted their backbone networks to carry voice traffic, including even voice traffic that originates and terminates at analog telephones, using VoIP. VoIP is therefore expected to play a significant role in voice telephony in the future. However, the convergence of traditional analog telephony and VoIP telephony has been hampered by the fact that IP addressing is substantially different from E.164 addressing. As noted above, E.164 addressing uses the ten-digit NPA-NXX-XXXX addressing format. In contrast, IP communications utilize a 32-bit IP address, which is divided into four 8-bit numbers having a hierarchical relationship that designates a sub-network and a terminal within the sub-network.

Since the E.164 numbering system and the IP address system are separate, a VoIP telephone may be associated with both an IP address and an E.164 telephone number. Furthermore, a party calling a VoIP telephone using an E.164 telephone number may not be aware of the IP address of the VoIP telephone.

SUMMARY

Some embodiments provide methods of routing a non-IP multimedia subsystem (IMS) message from a first user terminal that has telecommunications service provided by a first network carrier to a second user terminal that has telecommunications service provided by a second network carrier. Pursuant to these methods, a first telephone number mapping (ENUM) database is searched for an entry for the second user terminal. A second ENUM database is then queried to identify an address of a third ENUM database that is operated by the second network carrier in response to not finding any entry for the second user terminal in the first ENUM database. The identified address is used to query the third ENUM database. Routing information for the non-IMS message is then received from the third ENUM database in response to the query to the third ENUM database.

Pursuant to further embodiments, communications systems are provided that include an IP multimedia system (IMS) core that is configured to manage voice over IP communications sessions. These systems also have a non-IMS core that is configured to manage non-IMS communications such as Short Message Service (SMS) and/or Multimedia Message Service (MMS) communications. The systems further include a private ENUM database that is within the communications network and that is responsive to queries from both the IMS core and the non-IMS core, the private ENUM database containing records that include complete routing information for subscriber terminals within the communications network for both IMS and non-IMS communications.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
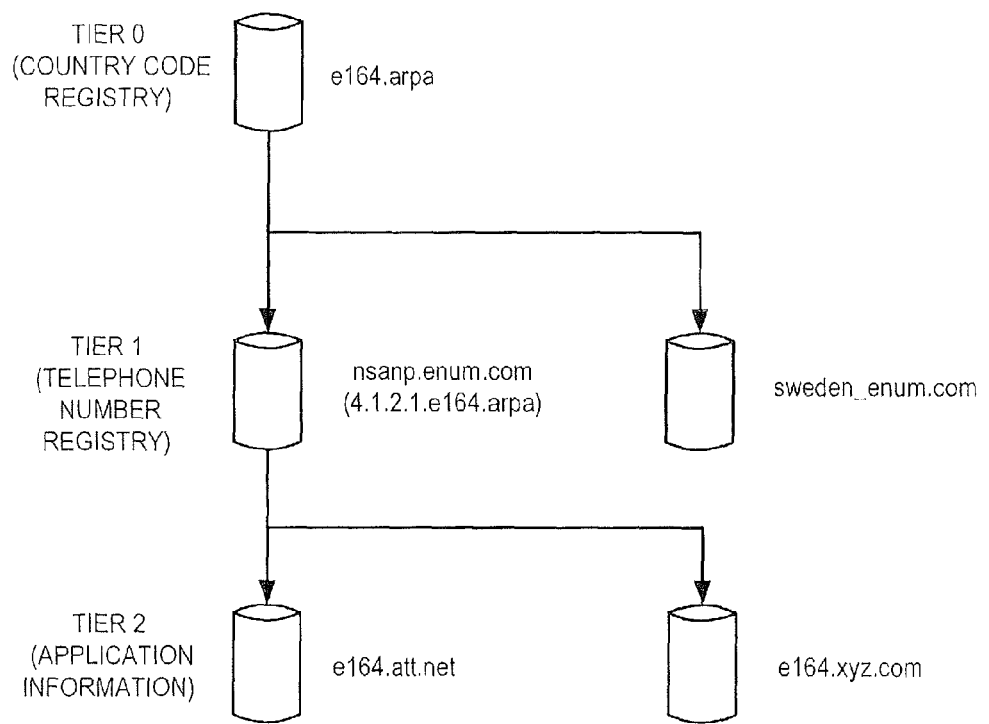
FIG. 1 is a schematic diagram illustrating the public ENUM infrastructure.

Embodiments are described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

TElephone NUmber Mapping (ENUM) is a suite of protocols that was designed to unify the E.164 telephone numbering system with the Internet Protocol addressing system. ENUM uses an indirect lookup method to obtain Naming Authority Pointer Resource (NAPTR) records associated with VoIP terminals from a network-based Domain Name Server (DNS) database, based on the E.164 telephone number of a VoIP terminal. A NAPTR record includes, among other things, information that designates how and where the VoIP terminal can be contacted. For example, a NAPTR record can designate what types of communications a terminal can establish, such as a VoIP connection using Session Initiation Protocol (SIP), a voice connection using the E.164 telephone number, a short message service (SMS) or multimedia message service (MMS) session, etc. The NAPTR may provide a uniform resource identifier (URI) that identifies how to contact the terminal to use a selected service, and may designate a priority for each of the various connection methods.

A NAPTR record for a VoIP terminal may be accessed using a URI/domain name that is mapped to the E.164 number assigned to the terminal. For example, the hypothetical E.164 number +1 (214) 111-2222 maps to the domain name 2.2.2.2.1.1.1.4.1.2.1.e164.arpa. That is, to construct the domain name associated with the NAPTR record for a particular E.164 telephone number, the numbers in the E.164 telephone number are reversed and separated by dots, and the domain suffix "e164.arpa" is appended to the string. In this manner, each E.164 number maps to a unique URI/domain name.

FIG. 1 generally illustrates the public ENUM infrastructure, which has a multiple tiered hierarchical structure. As illustrated in FIG. 1, Tier 0 represents the country code registry, which is used to provide information for obtaining NAPTR records for inter-country ENUM queries. Tier 1 of the ENUM infrastructure provides a telephone number registry that responds to intra-country queries. Tier 1 may be subdivided into additional tiers that service different area codes, for example. Tier 2 of the ENUM infrastructure represents private ENUM databases, such as the ENUM databases provided by particular communication service providers. A private ENUM database typically only includes routing information for subscribers within a single network operated by a particular communication service provider. Additionally, third parties can provide Tier 2 database services to a variety of entities, including carriers.

As an example, a query can be issued to a Tier 2 ENUM database, such as the e164.att.net Tier 2 database illustrated in FIG. 1, from a terminal or from the IP multimedia subsystem (IMS) core within a network in which the Tier 2 database resides. A query to the e164.att.net Tier 2 database can request, for example, routing information for a terminal that has the E.164 number +1 (512) 111-2222. To form the query, the E.164 number is re-formatted as an ENUM domain, and a query is constructed as follows:

$ORIGIN 2.2.2.2.1.1.1.2.1.5.1.e164.arpa

The above query is transmitted to the e164.att.net Tier 2 database. If the ENUM address is known to the e164.att.net Tier 2 database, then the e164.att.net Tier 2 database may return a NAPTR record including an entry as shown below.

IN NAPTR 100 10 "u" "sip+E2U" "!^.*$!sip:+15121112222@att.net"

The NAPTR record entry shown above provides call routing information for routing a SIP-based VoIP call to the called terminal. In particular, the NAPTR record includes a uniform resource identifier (URI) that can be used to establish the session. The NAPTR record contains a number of other fields, including call logic and processing fields that indicate relative priorities for different types of communications.

If the e164.att.net Tier 2 database does not have a record corresponding to the terminal identified in the query, the Tier 2 database may issue a secondary ENUM query to a Tier 1 database to obtain further information about where the desired NAPTR record can be obtained. For example, suppose that the original query to the Tier 2 database e164.att.net specified an ENUM domain 2.2.2.2.1.1.1.4.1.2.1.e164.arpa that is not known to the Tier 2 database e164.att.net. Then, a secondary ENUM query may be issued to a Tier 1 database associated with the numbering plan area (NPA) of the terminal named in the query. Thus, for example, a secondary query may be issued to a Tier 1 database associated with the domain 4.1.2.1.e164.arpa. The query to the Tier 1 database may be formed as follows:

$ORIGIN 4.1.2.1.e164.arpa

The Tier 1 database may respond to the query by providing a name server (NS) record that specifies a range of numbers whose routing information is known to the Tier 1 database. That is, the response from the Tier 1 database identifies the Tier 2 databases known to the Tier 1 database along with ranges of numbers managed by the Tier 2 databases. For example, the Tier 1 database may respond with an NS record that indicates that the desired number is managed by another Tier 2 database that is at the domain e164.xyz.com. The original query may then be forwarded to the appropriate Tier 2 database (i.e., the Tier 2 database that is at the domain e164.xyz.com) for fulfillment.

If the target terminal specified in the query is not within a range of numbers known to the Tier 1 database, then the Tier 1 database may issue a tertiary ENUM query to the Tier 0 database. The Tier 0 database may respond by identifying the appropriate country registry that can be used to satisfy the query. For example, suppose that the original query to the Tier 2 database e164.att.net specified an ENUM domain 2.2.2.2.1.1.1.4.1.2.4.4.e164.arpa that is not known to the Tier 2 database e164.att.net or to the Tier 1 database 2.1.5.1.e164.arpa. In that case, a query such as $ORIGIN e164.arpa can be issued to the Tier 0 database. The Tier 0 database responds with an identification of a Tier 1 database that can provide routing information for the target number. For example, the Tier 0 database may respond with an NS record such as the following:

4.4 IN NS sweden_enum.com

Then, a query can be issued to the Tier 1 database sweden_enum.com to obtain routing information for the specified number.

Figure 2:
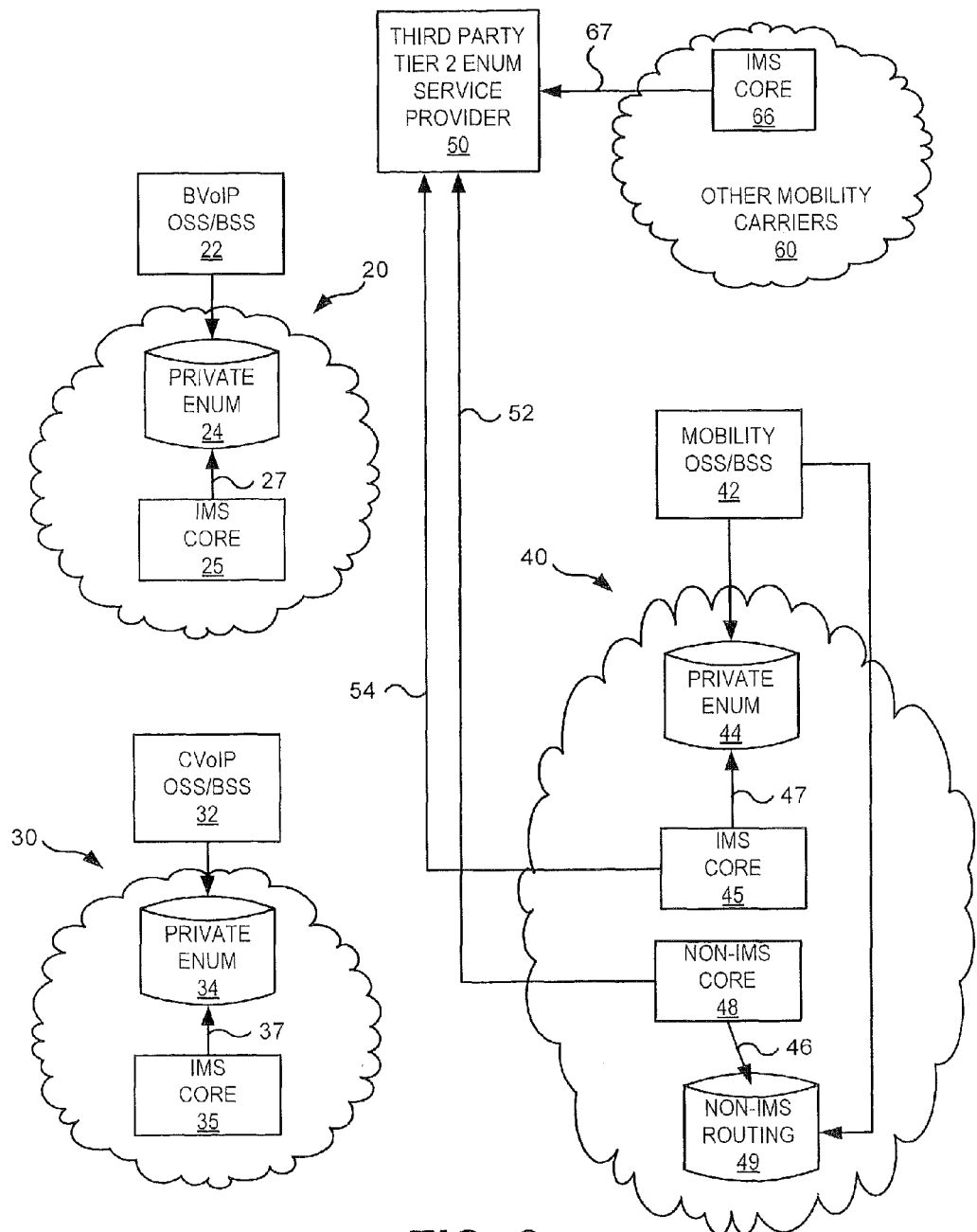
FIG. 2 is a schematic diagram illustrating a communications system including multiple communications services using private ENUM facilities.

VoIP and telephone carriers can also use ENUM and ENUM-like facilities for routing within their networks and to/from other carriers' networks. For example, FIG. 2 illustrates a network configuration for an exemplary telecommunications provider that operates multiple networks. As shown in FIG. 2, the telecommunications provider may operate, for example, a Business VoIP system (BVoIP) 20, a Consumer VoIP system (CVoIP) 30 and a wireless (i.e., mobility) system 40. Each of the systems may include an Operations Support System/Business Support System (OSS/BSS), which is a computer system that performs network related processes, such as maintaining network inventory, provisioning services, configuring network components, and managing faults, as well as customer support processes, such as taking orders, processing bills, and collecting payments. As the systems are typically managed separately, the BVoIP system 20 includes an OSS/BSS 22, the CVoIP system 30 includes an OSS/BSS 32, and the mobility system 40 includes an OSS/BSS 42.

Each of the systems 20, 30, 40 also includes a dedicated private ENUM database that can be used to store NAPTR records for use in call routing within the system. For example, the BVoIP system 20 can include a private ENUM database 24, the CVoIP system 30 can include a private ENUM database 34, and the mobility system 40 can include a private ENUM database 44. Each of the private ENUM databases 24, 34, 44 responds to queries originating from within its respective system 20, 30, 40, and provides NAPTR records that can be used for call routing within its respective system. The private ENUM databases 24, 34, 44 may be populated by information provided by the OSS/BSS 22, 32, 42 of its respective system 20, 30, 40.

The BVoIP system 20, the CVoIP system 30 and the mobility system 40 each includes a respective IP multimedia subsystem, or "IMS" core 25, 35, 45. "IMS" refers to a standardized framework for delivering IP multimedia communications services. IMS may be used to facilitate the access of multimedia and voice applications, such as VoIP, over an IP network. Thus, in the BVoIP system 20, the CVoIP system 30 and the mobility system 40, the respective IMS core 25, 35, 45 handles the processing associated with establishing and maintaining VoIP calls, as well as the use of VoIP routing for non-VoIP calls. As illustrated in FIG. 2, in each system, the IMS core 25, 35, 45 can send a respective query 27, 37, 47 to the private ENUM database 24, 34, 44 within its respective system to obtain call routing information for routing calls within the system. However, the private ENUM databases 24, 34, 44 may only provide ENUM based routing information and services to authorized entities within their respective systems 20, 30, 40, such as the IMS cores 25, 35, 45. As such, the private ENUM databases 24, 34, 44 may not be accessible outside the illustrated network of FIG. 2 (to respond to queries from other carriers for routing information, for example), because providing such routing information outside the system may undesirably expose proprietary information about network architectures, routing schemes, and the like, to third parties. The private ENUM databases 24, 34, 44 also may not be accessible to systems operated by the same carrier (e.g., the private ENUM database 24 may not be accessed by the IMS core 35 or any other entity within the CVoIP system 30).

As is further shown in FIG. 2, the mobility system 40 further includes "non-IMS" core 48. This non-IMS core 48 performs the processing associated with establishing, routing and maintaining certain types of non-IMS communications such as, for example, Short Message Service (SMS) communications and Multimedia Message Service (MMS) communications. The mobility system 40 further includes a non-IMS routing database 49. The non-IMS routing database 49 includes routing information that may be used to route non-IMS messages within the mobility system 40. The non-IMS routing database 49 may be populated by information provided by the OSS/BSS 42 of mobility system 40. The non-IMS core 48 can send a query 46 to the non-IMS routing database 49 to obtain routing information for routing a non- IMS communications within the mobility system 40. However, the non-IMS routing database 49 is not accessible to other systems (and hence cannot be used to respond to queries from other carriers for routing information, for example), and only includes information regarding receiving terminals that are within mobility system 40.

As shown in FIG. 2, for telephone calls directed to terminals outside the network administered by a system 20, 30, 40, the IMS core 25, 35, 45 can issue a query 52 to a third party Tier 2 ENUM service provider 50. If the receiving terminal is known to the third party Tier 2 ENUM service provider 50, the third party Tier 2 ENUM service provider 50 can respond to the query with a NAPTR record that indicates how to route a particular telephone call to the receiving terminal. As is also shown in FIG. 2, for non-IMS communications that are directed to terminals outside of mobility system 40, the non-IMS core 48 issues a query 54 to the third party Tier 2 ENUM service provider 50. If the receiving terminal is known to the third party Tier 2 ENUM service provider 50, the third party Tier 2 ENUM service provider 50 can respond to the query with information that indicates how to route a particular non-IMS communication to the receiving terminal.

The third party Tier 2 ENUM service provider 50 can process queries from many different communications providers. For example, a third party carrier 60 may include an IMS core 66 that can also issue queries 67 to the third party Tier 2 ENUM service provider 50, for example, to obtain routing information for calls addressed to terminals within the mobility system 40. However, the communications providers must pay to access the third party Tier 2 ENUM service, and may have to pay to list routing information with the third party Tier 2 ENUM service provider 50 regarding terminals within their respective networks. Thus, relying on third party Tier 2 ENUM service providers to obtain routing information may not be ideal. Furthermore, as explained above, it is generally undesirable to provide comprehensive ENUM routing information to a third party communication service provider. Thus, it may not be desirable to permit third party communication service providers to directly query a private Tier 2 ENUM database for call routing information, or to provide complete end-to-end routing information in response to such requests.

Methods and systems are disclosed herein that provide a common ENUM architecture that facilitates inter-carrier communications that may reduce the need to rely on third party Tier 2 ENUM service providers. Moreover, the disclosed methods and systems enable non-IMS elements to query the common ENUM solution to obtain routing information for non-IMS communications such as SMS and MMS messages, thereby reducing or eliminating any need for maintaining separate non-IMS routing databases. The disclosed methods and systems may be used to send inter-carrier non-IMS messages from both an IP terminal to another IP terminal and from an IP terminal to a terminal attached to the PSTN.

A common ENUM solution has typically not been provided for the routing of non-IMS messages such as SMS and MMS messages. By way of example, a wireless system of a particular carrier (e.g., Carrier A) may include a non-IMS core and an internal non-IMS routing database for the routing of non-IMS messages. As such non-IMS messages may be routed based solely on IP routing protocols, the internal database would typically not be an ENUM, but instead would comprise a database with the necessary IP routing information. When a terminal within the wireless system seeks to send a non-IMS message, a query is sent to the non-IMS core. The non-IMS core then queries the internal non-IMS routing database to determine if it includes the necessary information to route a non-IMS communication. If the terminal that is to receive the non-IMS message is also within wireless system, then the necessary routing information is stored in the internal non-IMS routing database, and this routing information is returned to the non-IMS core and used to route the non-IMS message to the destination terminal. However, if the destination terminal is not within the wireless system, then the internal non-IMS routing database would fail to provide the necessary information. When this occurs, the non-IMS core then queries an external, third party ENUM database that returns the necessary routing information to the non-IMS core. This process may be slow, may require that Carrier A make payments to the service provider associated with the third party ENUM database, and may require that Carrier A provide periodic updates to the third party ENUM database so that the third party ENUM database includes the necessary information to route non-IMS messages to terminals within the wireless system.

The common ENUM architecture according to some embodiments includes a three-level hierarchy of ENUM database servers. The first level of this hierarchy is an industry-level Tier 0/1 ENUM database. This industry-level Tier 0/1 ENUM database can be queried by any communication service provider. The second level of the hierarchy is a private ENUM database, which is typically operated by a communications service provider. In contrast to the industry-level Tier 0/1 database, the private ENUM database, which may be similar to the private ENUM databases 24, 34, 44 illustrated in FIG. 2, is accessible only from within the network of the communications service provider (the "home network"), and hence can provide complete routing information. The private ENUM database may be accessed by multiple communications systems 20, 30, 40 operated by the same carrier.

The third level of the three-level hierarchy of ENUM database servers is a Tier 2* ENUM database. The Tier 2* ENUM database may differ from a conventional Tier 2 ENUM database in that the Tier 2* ENUM database is accessible to approved third party communication service providers, and is typically not queried by devices within the home network. However, the routing information provided by the Tier 2* ENUM database does not provide full routing information in response to a query. Rather, a Tier 2* ENUM database according to some embodiments may only provide information sufficient to identify a network entry point or gateway that can be used to route a communication to a particular terminal. Thus, a Tier 2* ENUM database can provide information that is sufficient to allow a third party communication service provider to route a call to a terminal in the carrier's home network without providing complete routing information to the third party.

Figure 3:
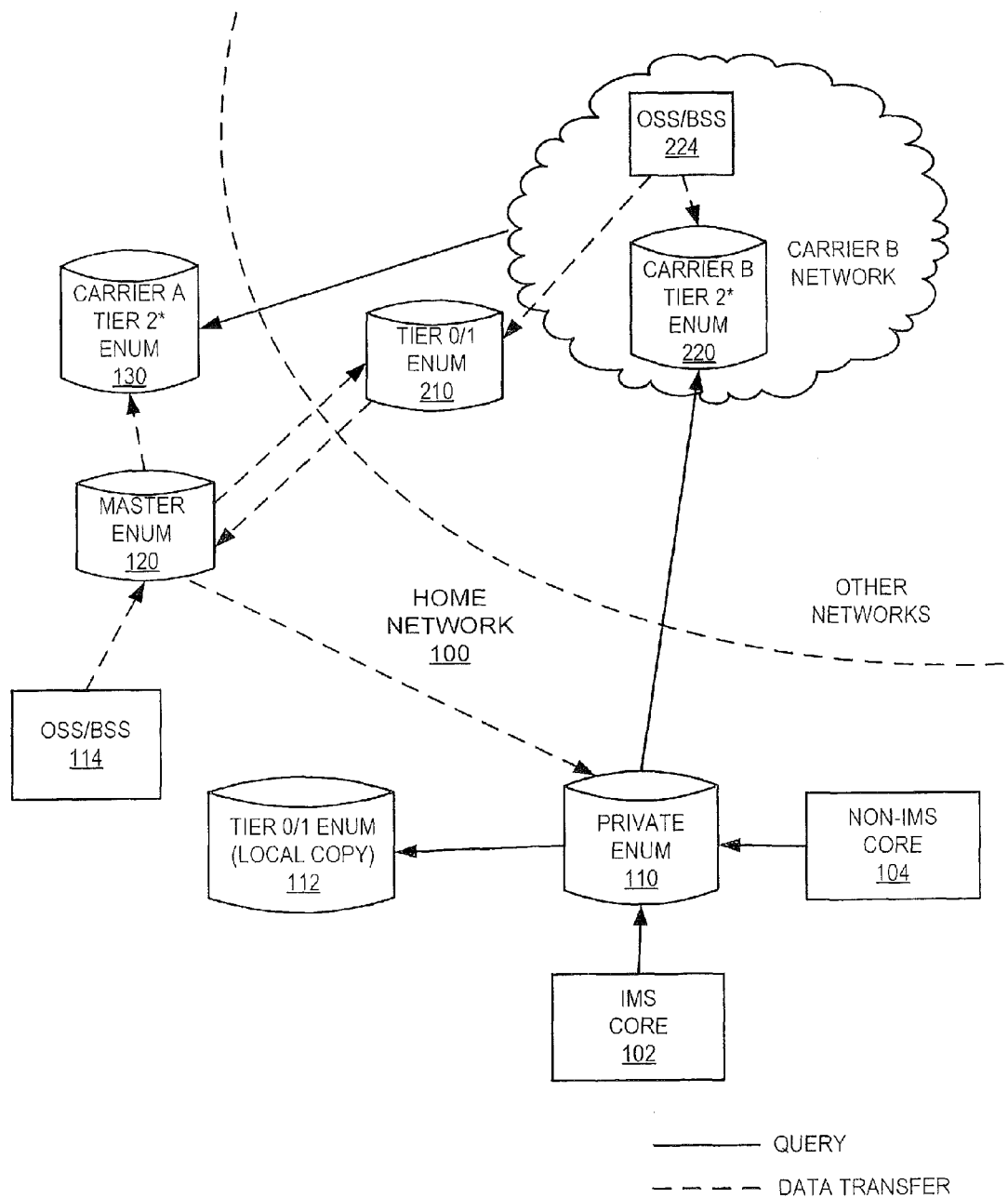
FIG. 3 is a block diagram of a communications system in which some embodiments can be implemented.

An ENUM architecture according to some embodiments is illustrated in FIG. 3. As shown in FIG. 3, a communications service provider (Carrier A) operates a home network 100 in which voice calls, SMS messages, MMS messages and other communications sessions can be transported using IP protocols. The home network 100 therefore includes an IMS core 102 that handles establishment, maintenance and take-down of IMS IP communication sessions. The home network 100 further includes a non-IMS core 104 that handles establishment, maintenance and take-down of non-IMS IP communication sessions such as SMS and MMS communications. The home network 100 further includes a private ENUM database 110, and may further include a local copy 112 of the Tier 0/1 ENUM database that is obtained from a Tier 0/1 ENUM database 210 located outside the home network 100 of Carrier A.

A master ENUM database 120 contains complete routing information for all terminals within the home network 100.

The master ENUM database 120 is populated with information supplied by an OSS/BSS 114 which may service more than one communications system within the home network. For example, the OSS/BSS may service both landline communication systems (including, for example, Business VoIP systems, Consumer VoIP systems and conventional PSTN circuit switched systems) and wireless communication systems within the home network 100. In some embodiments, the master ENUM database 120 and the private ENUM database 110 can be implemented in the same database facility.

As is further shown in FIG. 3, the home network 100 further includes a Tier 2* ENUM database 130 that is accessible by third party carriers. The private ENUM database 110 and the Tier 2* ENUM database 130 are both populated with information supplied from the master ENUM database 120. It will be appreciated that the Tier 2* ENUM database 130 may not be supplied with complete routing information for each terminal within the home network 100. Rather, the Tier 2* ENUM database may be supplied only with information sufficient to identify a network entry point for each terminal within the home network 100. In contrast, the private ENUM database 110 stores internal routing information for each terminal in the home network 100. Thus, for example, a NAPTR record provided by the private ENUM database 110 may, for example, include a URI that points to the actual terminal, rather than to a network entry point.

Also illustrated in FIG. 3 is an industry Tier 0/1 ENUM database 210 that is populated with information provided by cooperating communication service providers, such as Carrier A. Other carriers may also maintain their own Tier 2* ENUM database. For example, as shown in FIG. 3, a second communications service provider (Carrier B) may maintain a Tier 2* ENUM database 220 that is accessible by other communication service providers, such as Carrier A. The Tier 2* ENUM database 220 of Carrier B is populated by the OSS/BSS 224 of Carrier B.

As shown in FIG. 3, the private ENUM database 110 can be queried by both the IMS core 102, as well as by the non-IMS core 104. The private ENUM database 110 can consult the local copy of the Tier 0/1 database 112 to fulfill queries, if necessary. Likewise, the private ENUM database 110 can also consult the Tier 2* ENUM databases of other carriers, such as the Tier 2* ENUM database 220 of Carrier B, if it is determined that a called terminal is located in a network operated by Carrier B. Similarly, the Tier 2* database 130 of Carrier A can be queried by third parties outside the home network 100, as is also shown in FIG. 3.

Figure 4:
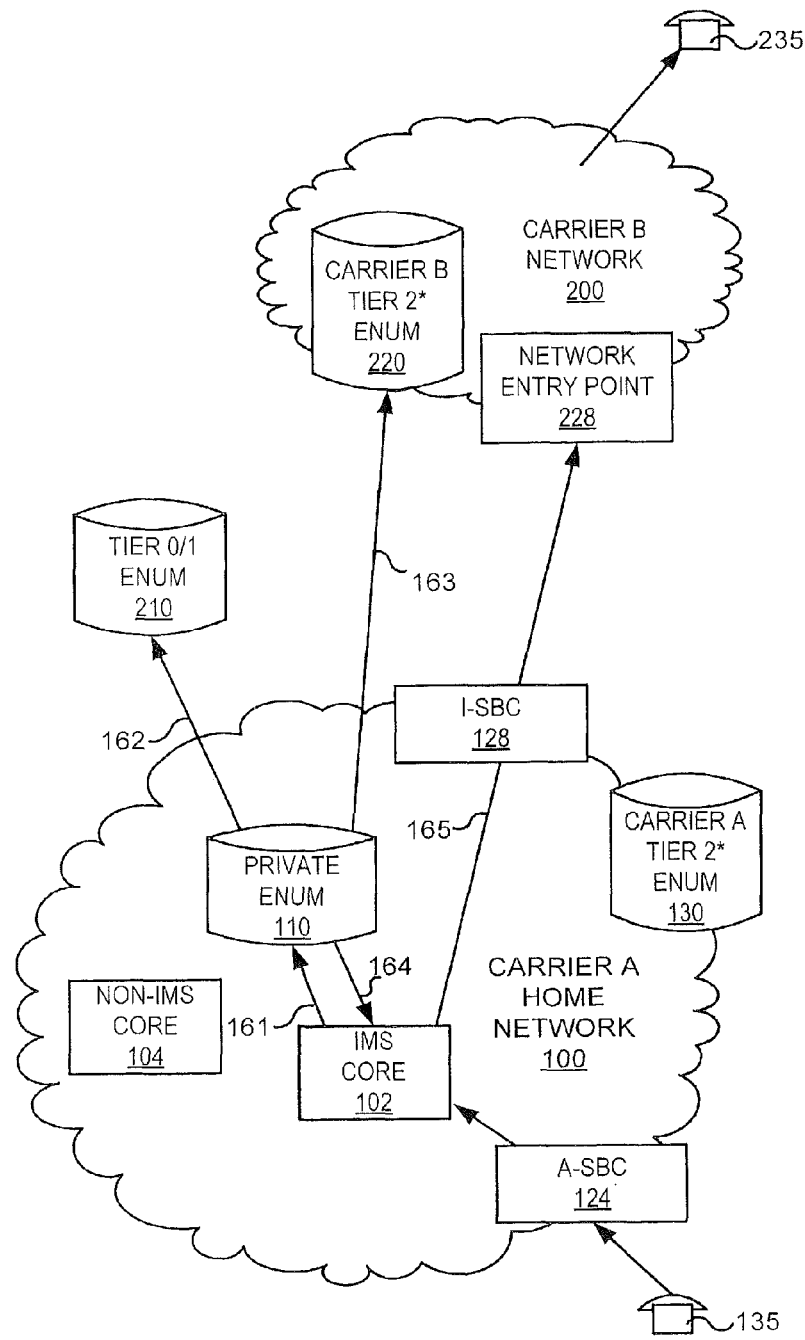
FIG. 4 is a block diagram that illustrates routing of a VoIP call to a terminal in an external network using ENUM facilities according to some embodiments.

Operations associated with calling into and out of the home network 100 will now be discussed in connection with FIGS. 4 and 5. Some exemplary operations associated with calling a terminal in a third party network 200 from a home network 100 are illustrated in FIG. 4. The home network 100 includes an IMS core 102, a non-IMS core 104, a private ENUM database 110 and a Tier 2* ENUM database 130.

The home network 100 may be accessed through one or more session border controllers, such as the interconnected session border controller (I-SBC) 128 and the access-edge session border controller (A-SBC) 124. In general, a session border controller (SBC) is a device that is used by VoIP providers to control signaling and media streams involved in setting up, conducting and taking down VoIP calls. Thus, an SBC may be placed in the VoIP signaling path between the calling and called terminals. In addition to call setup and takedown, an SBC can provide, among other things, access control, and data conversion services for the communications they control. In some cases, an SBC can act as a user agent for a terminal within its network, which allows a network to exercise additional control over calls within the network.

As an example, a terminal 135 that is serviced by the home network 100 may attempt to place a call to a remote terminal 235 that is serviced by a third party communication service provider, Carrier B. In order to establish the call, the user of the terminal 135 may dial a 10-digit E.164 telephone number, which is provided to the access-edge SBC 124. The A-SBC 124 routes the call request to the IMS core 102. In order to set up the call, the IMS core 102 issues a query 161 to the private ENUM database 110 of the home network 100 in an attempt to obtain an NAPTR record associated with the E.164 address dialed by the user. Because the E.164 number dialed by the user corresponds to a remote terminal 235 that is not serviced by the home network 100, the private ENUM database 110 would not find an entry for the called E.164 number.

Having failed to find a record corresponding to the called E.164 number, the private ENUM database 110 issues a query 162 to the Tier 0/1 ENUM database 210 (or a local copy 112 of the Tier 0/1 ENUM database, which is not depicted in FIG. 4) for the called E.164 number. In this example, the Tier 0/1 database 210 finds an entry for the called E.164 number and returns an NS record with the address of the Tier 2* ENUM database for the carrier of record of the E.164 number (in this example, Carrier B). For example, assuming the called telephone number is (512) 111-2222, the Tier 0/1 database 210 may return an NS record that identifies the Tier 2* ENUM database 220 for the carrier of record for the called number as follows:

2.2.2.2.1.1.1.2.1.5.1 IN NS tier2enum.carrier_b.net

The private ENUM database 110 next issues a query 163 to the Tier 2* ENUM database 220 identified in the NS record provided by the Tier 0/1 database 210. For example, the query 163 issued by the private ENUM database 110 may have the form:

$ORIGIN 2.2.2.2.1.1.1.2.1.5.1.e164enum.net

In response, the Tier 2* ENUM database 220 in the third party network may provide a NAPTR record identifying a gateway where Carrier B desires to receive calls for the called terminal 235. For example, the NAPTR record returned by the Tier 2* database 220 may have the following form:

NAPTR 10 100 "u" "E2U+sip" "!^.*$!sip:gw02@carrier_b.net"

Note that the URI in the NAPTR record (sip:gw02@carrier_b.net) directs the call not to the terminal 235, but to a network entry point 228, such as a gateway or other network interface device, within Carrier B's network 200. That is, the routing information provided by the Tier 2* ENUM database 220 of the third party carrier may not provide complete routing information for the SIP connection. However, the Tier 2* ENUM database 220 does provide sufficient information to the private ENUM database 110 of the home network 100 to allow the call to be established. The private ENUM database 110 next sends a message 164 that contains the NAPTR record returned by the Tier 2* ENUM database 220 to the IMS core 102. The IMS core 102 then forwards call processing information 165 to the network entry point 228 of the third party carrier that was identified in the URI of the NAPTR record provided by the Tier 2* ENUM database 220 through the I-SBC 128. For example, the IMS core 102 may send a SIP INVITE message to the network entry point 228 associated with the URI in the NAPTR record returned by the Tier 2* ENUM database 220. Call setup may then proceed in a conventional manner with the network entry point 228 functioning as an agent for the called terminal 235.

Figure 5:
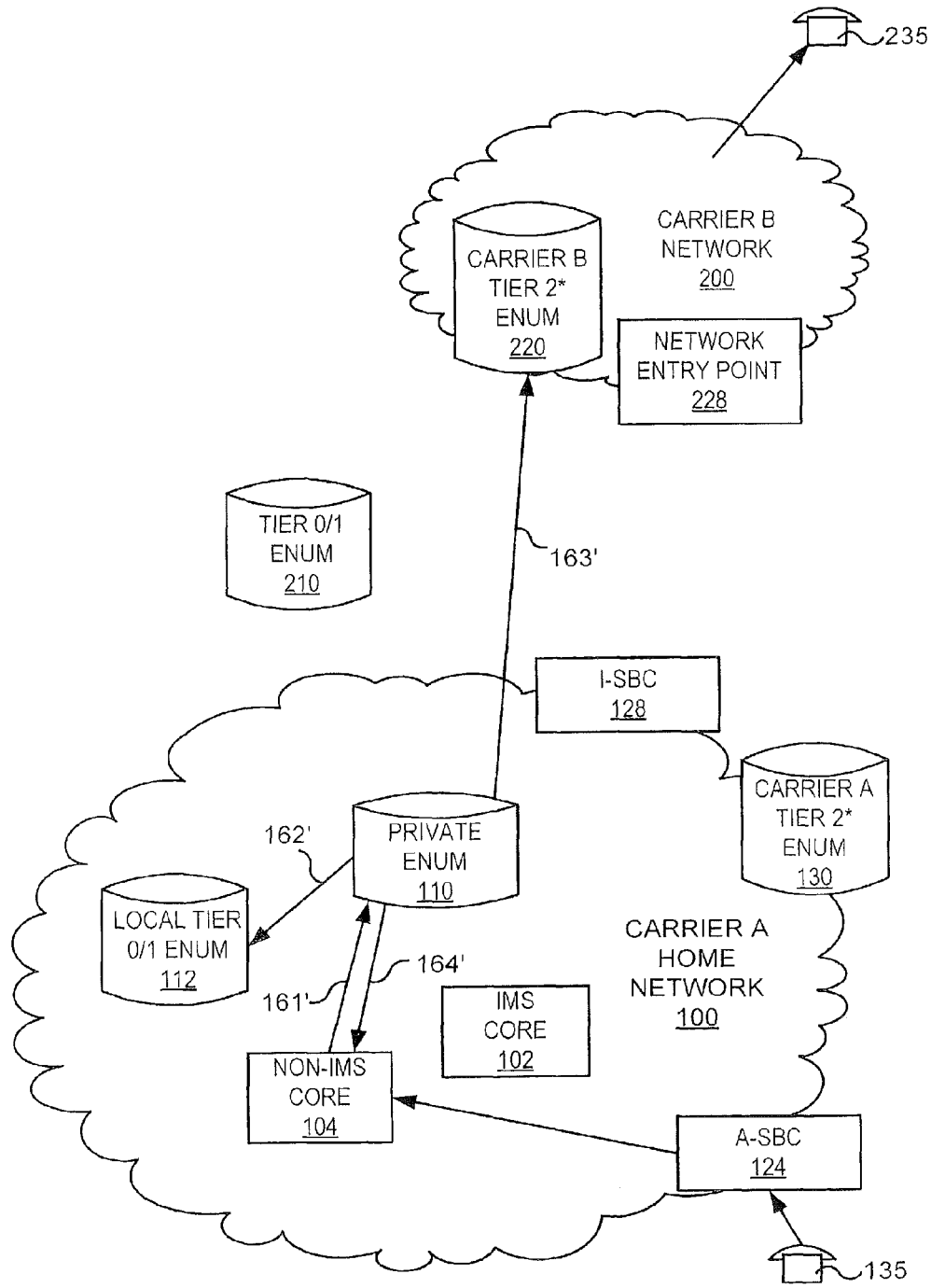
FIG. 5 is a block diagram that illustrates routing of a non-IMS communication to a terminal in an external network using ENUM facilities according to some embodiments.

FIG. 5 illustrates operations associated with sending a non-IMS communication from the terminal 135 in home network 100 to the terminal 235 in the network 200 operated by Carrier B. As with a standard call, the terminal 135 sends a non-IMS communications request to the home network 100 through A-SBC 124. The A-SBC 124 routes the communications request to the non-IMS core 104. The non-IMS core 104 issues a query 161' to the private ENUM database 110 of the home network 100 in an attempt to obtain routing information for the non-IMS communication to terminal 235. Because the terminal 235 is not serviced by the home network 100, the private ENUM database 110 would not have routing information for terminal 235.

Having failed to find routing information for terminal 235, the private ENUM database 110 issues a query 162' to a local copy 112 of the Tier 0/1 ENUM database 210 for routing information for terminal 235. In this example, the Tier 0/1 database 112 finds the appropriate routing information and returns an NS record with the address of the Tier 2* ENUM database for the carrier of record for terminal 235 (in this example, Carrier B). The private ENUM database 110 next issues a query 163' to the Tier 2* ENUM database 220 identified in the NS record provided by the Tier 0/1 database 112. In response, the Tier 2* ENUM database 220 in the third party network may provide routing information (e.g., a URI for routing the session) for a network entry point where Carrier B desires to receive calls for the called terminal 235. The private ENUM database 110 next sends a message 164' that contains the NAPTR record returned by the Tier 2* ENUM database 220 to the non-IMS core 104. The non-IMS core 104 then facilitates routing the non-IMS communication from the terminal 135 to the network entry point 228 of the third party carrier through the I-SBC 128. The network entry point 228 then completes (typically with the assistance of other elements of the Carrier B network 200 that are not shown in FIG. 5) the routing of the non-IMS communication to the terminal 235.

Figure 6:
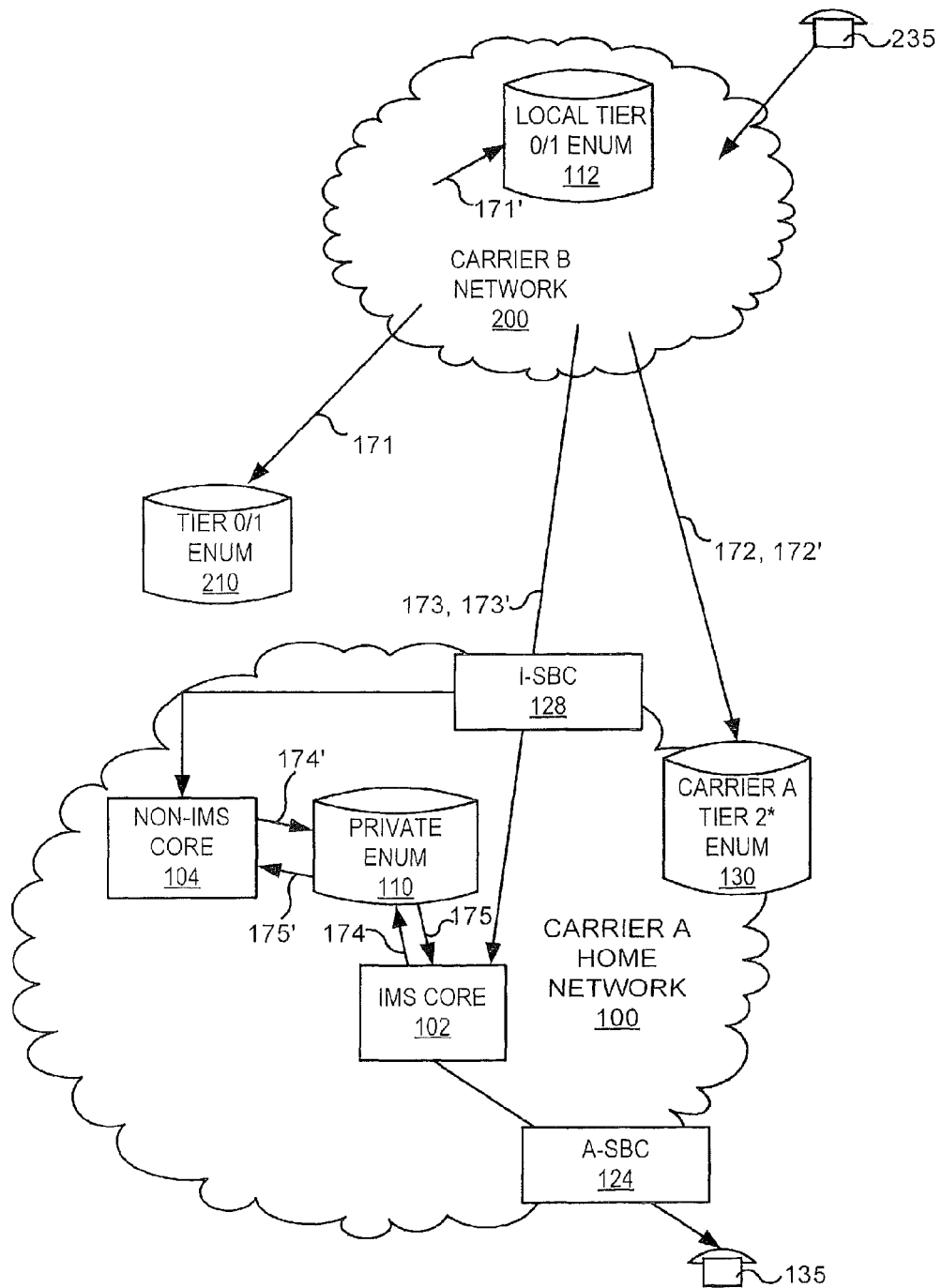
FIG. 6 is a block diagram that illustrates routing of both an incoming VoIP call and routing of an incoming non-IMS communication using ENUM facilities according to some embodiments.

Some exemplary operations associated with calling and/or sending a non-IMS communication to a terminal in the home network 100 from the third party network 200 are illustrated in FIG. 6. As shown in FIG. 6, when a call is placed from the terminal 235 in a third party network 200 to the terminal 135 in the network 100 of Carrier A, the third party network carrier (Carrier B) issues a query 171 to the Tier 0/1 ENUM database 210. The Tier 0/1 ENUM database returns an NS record with the address of the Tier 2* ENUM database 130 for Carrier A, the carrier of record for the called terminal 135. Next, Carrier B issues a query 172 to the Tier 2* ENUM database 130 for Carrier A requesting routing information for the called terminal 135. The Tier 2* ENUM database 130 for Carrier A responds with an NAPTR record identifying the connection point for routing the call to the called terminal 135. For example, the NAPTR record returned by the Tier 2* ENUM database 130 may have the following form:

NAPTR 100 4 "u" "E2U+sms:tel" "!^.*$!tel:41771234567!"

That is, the NAPTR record returned by the Tier 2* ENUM database 130 may include a URI identifying the I-SBC 128 as the connection point for establishing the call. The NAPTR record provided by the Tier 2* ENUM database 130 does not contain complete routing information for the SIP connection. For example the NAPTR record does not include a URI for the called terminal 135. However, the NAPTR record provided by the Tier 2* ENUM database 130 does provide enough information for the third party network 200 to route the call.

Next, Carrier B forwards call processing information 173, such as a SIP INVITE message, to the connection point identified in the NAPTR record, namely, the I-SBC 128, which forwards the call processing information 173 to the IMS core 102.

Next, the IMS core 102 issues a query 174 to the private ENUM database 110 to obtain call routing information for the call. The private ENUM database 110 responds to the query from the IMS core 102 with internal routing instructions 175 that may include multiple NAPTR records. For example, the private ENUM database 110 may respond with NAPTR records specifying connection parameters for a SIP connection, a voice connection, an SMS connection, etc. Based on the service type requested by the originating carrier, the IMS core 102 chooses an appropriate NAPTR record and uses the URI specified in the NAPTR record to set up the session. In some embodiments, the IMS core 102 can instruct the I-SBC 128 to establish the session using the URI specified in the NAPTR record.

A similar process may be used for the terminal 235 in the third party network 200 to send a non-IMS message to the terminal 135 in the network 100 of Carrier A. In particular, the third party network carrier (Carrier B) issues a query 171' to, for example, a local copy 212 of the Tier 0/1 ENUM database 210. The Tier 0/1 ENUM database 212 returns an NS record with the address of the Tier 2* ENUM database 130 for Carrier A, the carrier of record for the called terminal 135. Next, Carrier B issues a query 172' to the Tier 2* ENUM database 130 for Carrier A requesting the routing information necessary to route the non-IMS message to terminal 135. The Tier 2* ENUM database 130 for Carrier A responds with routing information to the connection point (i.e., the routing information to I-SBC 128) that will act as an agent for receiving non-IMS messages to the terminal 135.

Next, Carrier B forwards non-IMS message processing information 173' to the identified connection point, namely, the I-SBC 128, which forwards the non-IMS message processing information 173' to the non-IMS core 104. Upon receiving this information, the non-IMS core 104 issues a query 174' to the private ENUM database 110 to obtain the routing information necessary to route the non-IMS message to terminal 135. The private ENUM database 110 responds to this query with internal routing instructions 175' that include a URI for non-IMS messages that are to be sent to terminal 135. The non-IMS core 104 then facilitates routing the non-IMS message to the specified URI for terminal 135.

In some circumstances, the local copy 212 of the Tier 0/1 ENUM database 210 will not include any entry for the E.164 number include in the query 171'. When this occurs, the non-IMS core 104 realizes that the destination terminal is within the PSTN, and hence the logic in the non-IMS core 104 forwards the non-IMS message to the PSTN. The PSTN may then route the non-IMS message using conventional techniques.

Figure 7:
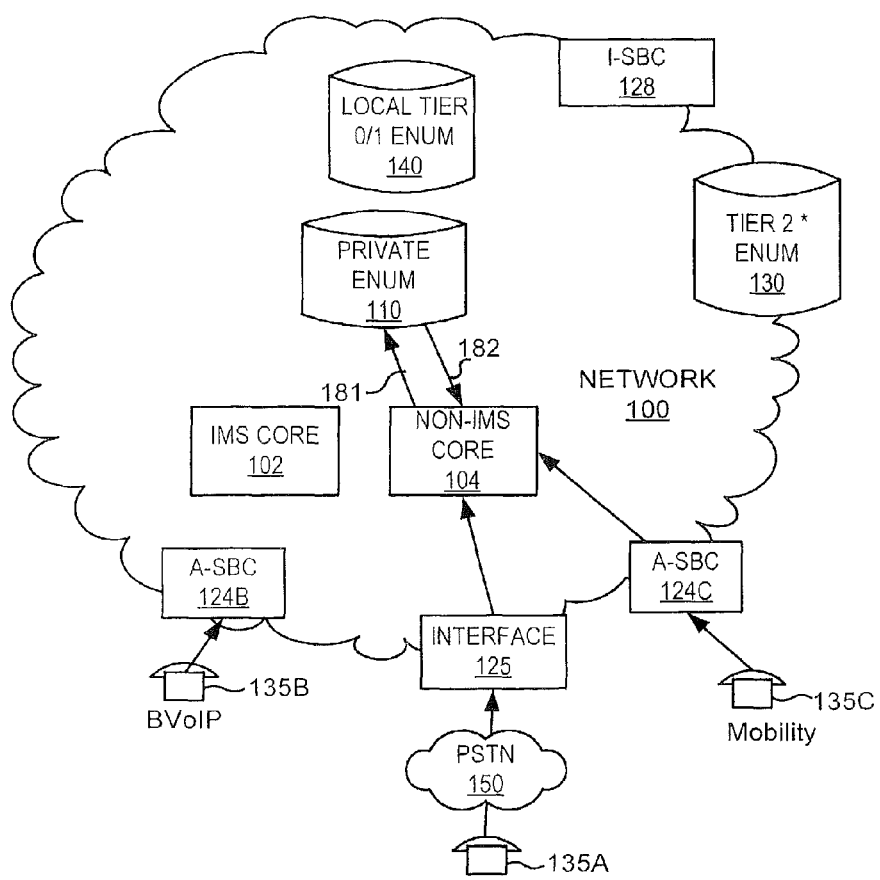
FIGS. 7, 8 and 9 are block diagrams that illustrate operations associated with establishing IP-based connections to/from terminals located in different networks operated by a single communications service provider using a common ENUM solution according to some embodiments.

Operations associated with establishing IMS and non-IMS IP-based connections to/from terminals located in different networks that are operated by a single communications service provider using a common ENUM solution will now be discussed in connection with FIGS. 7, 8 and 9. Some exemplary operations associated with calling a terminal in one communications system within a network 100 from another terminal connected to another communications system within the same network 100 are illustrated in FIG. 7. As shown in FIG. 7, the network 100 includes an IMS core 102, a non-IMS core 104, a private ENUM database 110, a Tier 2* ENUM database 130 and a local copy of a Tier 0/1 ENUM database 140. The network 100 may be accessed through one or more session border controllers, such as the I-SBC 128 and A-SBCs 124B, 124C. The network 100 can also be accessed by an analog voice terminal 135A in a PSTN 150 via an interface 125.

As an example, a VoIP terminal 135C that is part of a mobility (wireless) system that is managed by the carrier operating the network 100 may attempt to send a non-IMS message to another terminal 135B that is within a BVoIP system that is also managed by the carrier of the mobility system. In order to send this non-IMS message, the user of the terminal 135C may use a 10-digit E.164 telephone number to address the non-IMS message, which is provided to the access-edge SBC 124C. The A-SBC 124C routes the messaging information to the non-IMS core 104, which provides a common core for the mobility and BVoIP systems. In order to deliver the non-IMS message, the non-IMS core 104 issues a query 181 to the private ENUM database 110 of the network 100 in an attempt to obtain an NAPTR record associated with the E.164 address specified by the user of terminal 135C.

Because the destination terminal 135B is located within a system that is managed by the carrier operating network 100, the private ENUM database 110 finds an entry corresponding to the ENUM domain specified in the query, and responds by providing the non-IMS core 104 a NAPTR record 182 that contains the URI necessary to route the non-IMS message. The non-IMS core 104 uses the specified URI to facilitate routing the non-IMS message to the destination terminal 135B through the A-SBC's 124B, 124C.

Similarly, a non-IMS message request forwarded from a PSTN telephone 135A may enter the network 100 through the interface 125. The interface 125 routes the request to the non-IMS core 104. The non-IMS core 104 issues a query 181 to the private ENUM database 110 of network 100 in an attempt to obtain an NAPTR record associated with the E.164 address of the non-IMS message request. Because the destination terminal 135B is located within a system that is managed by the network 100, the private ENUM database 110 finds an entry corresponding to the ENUM domain specified in the query, and responds with routing information. The non-IMS core 104 then uses the URI included in the routing information to facilitate routing the non-IMS message to destination terminal 135B.

Figure 8:
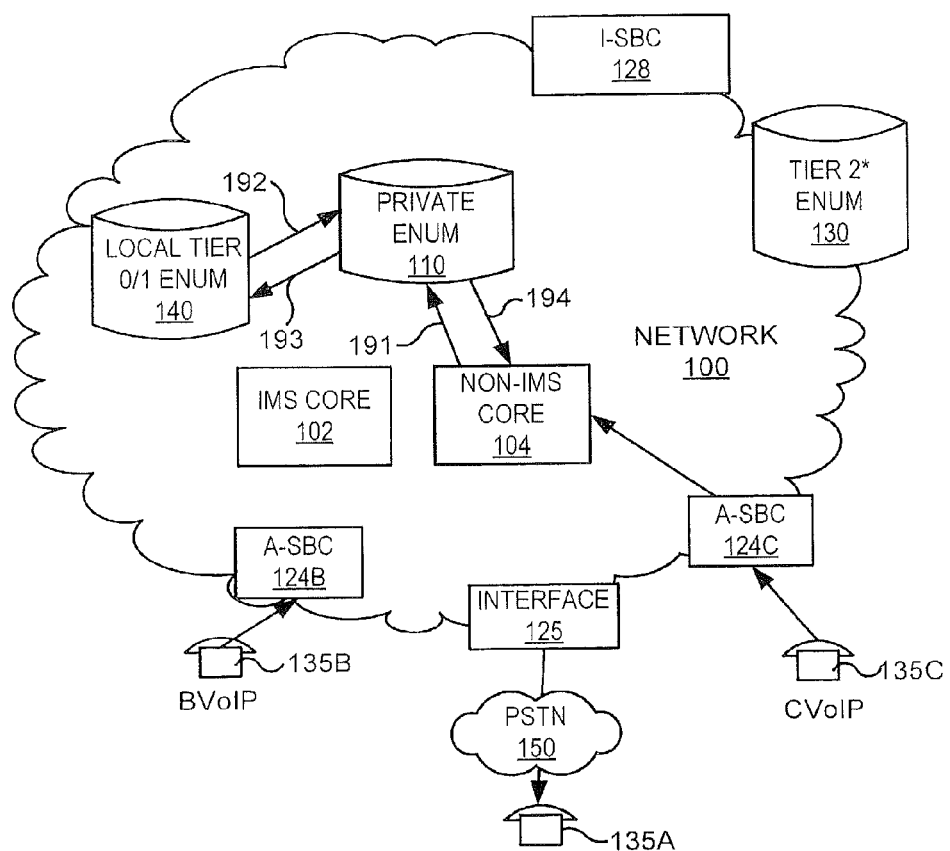

FIG. 8 illustrates operations associated with routing a non-IMS message from an IP-based terminal within the network 100, such as the mobility terminal 135C or the BVoIP terminal 135B to a PSTN telephone 135A. A user of the mobility terminal 135C or the BVoIP terminal 135B prepares a non-IMS message such as an SMS message and addresses the message using the 10-digit E.164 number of the PSTN telephone 135A. When the user of the mobility terminal 135C or the BVoIP terminal 135B "sends" the message, a message request is forwarded to the non-IMS core 104. In response to receiving this message request, the non-IMS core 104 issues a query 191 to the private ENUM database 110. However, in the present example, contact information for the PSTN telephone 135A has not been ported to the private ENUM database 110, and thus the private ENUM database 110 would not find an entry for the PSTN telephone 135A. The private ENUM database 110 therefore issues a secondary query 192 to, for example, a local copy 140 of a Tier 0/1 ENUM database. Assuming that the response 193 from the local copy 140 of the Tier 0/1 ENUM database indicates that no entry corresponding to the dialed E.164 number was found, the private ENUM database 110 would, in a response 194, return no NAPTR records to the non-IMS core 104 in response to the query 191. The non-IMS core 104 would then forward the message request to the PSTN (not shown in FIG. 8), which would perform a local number portability (LNP) determination to find the location of the PSTN telephone 135A and route the SMS message thereto.

Figure 9:
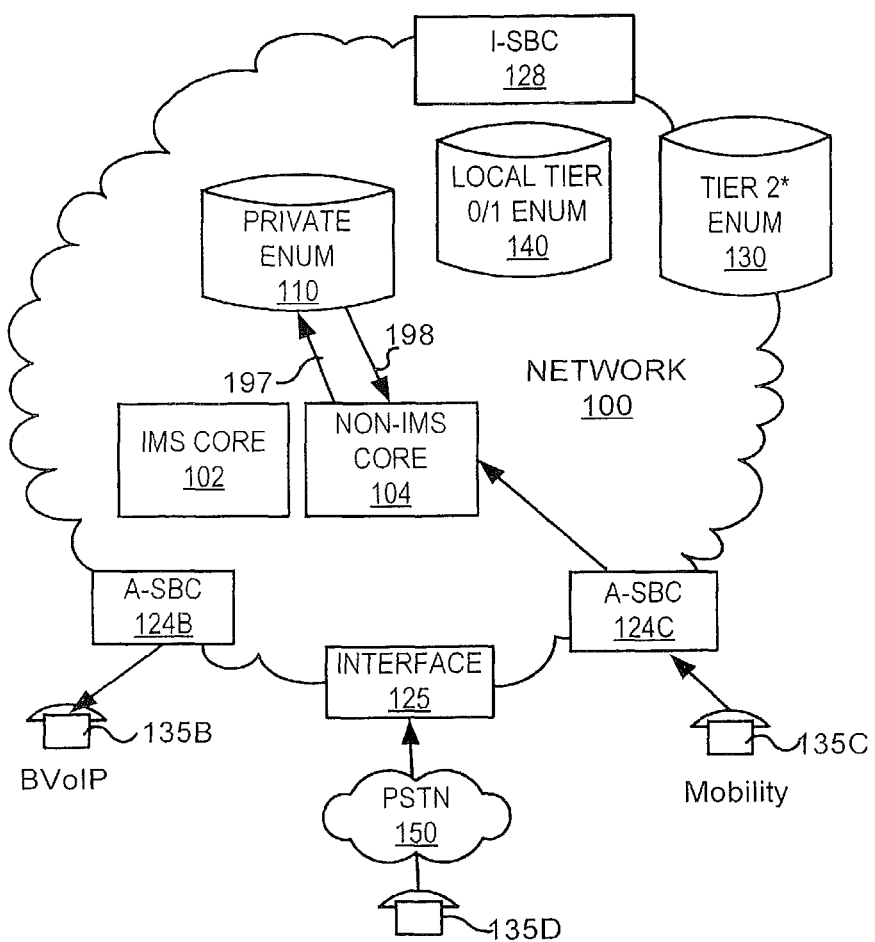

In contrast, FIG. 9 illustrates operations associated with routing a non-IMS message from an IP-based terminal within the network 100, such as the mobility terminal 135C or the BVoIP terminal 135B to a ported PSTN telephone 135D. A user of the mobility terminal 135C or the BVoIP terminal 135B addresses the non-IMS message with the 10-digit E.164 number of the PSTN telephone 135D. The message request is forwarded to the non-IMS core 104, which then issues a query 197 to the private ENUM database 110. Because, in the present example, contact information for the PSTN telephone 135D has been ported to the private ENUM database 110, the private ENUM database 110 would find an entry for the PSTN telephone 135D. The private ENUM database 110 therefore returns routing information 198 to the non-IMS core 104 that includes LNP corrected data and indicates that the PSTN does not need to perform an LNP determination. The non-IMS core 104 would then facilitate routing the non-IMS message to the PSTN 150.

Figure 10:
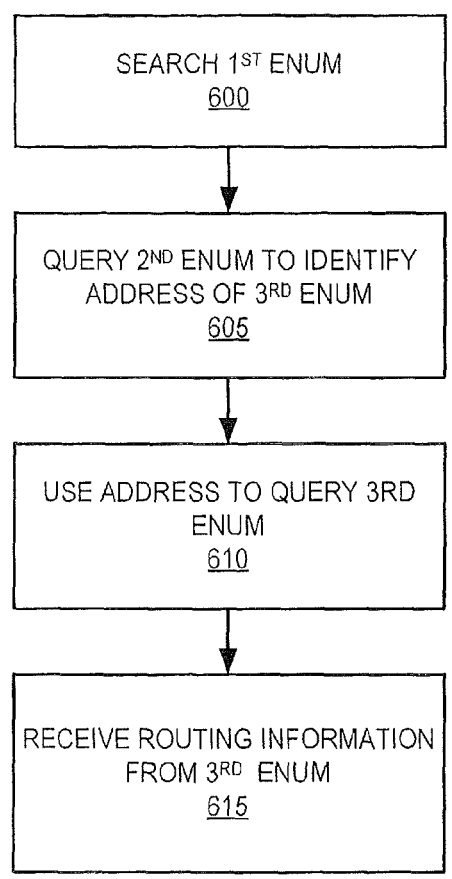
FIGS. 10 and 11 are flowcharts that illustrate call setup operations according to some embodiments.

FIG. 10 illustrates methods according to certain embodiments of routing non-IMS messages from a first user that has telecommunications service provided by a first network carrier to a second user that has telecommunications service provided by a second network carrier. Pursuant to these methods, a first ENUM database is searched in an effort to locate an entry for the second user terminal (block 600). Then, a second ENUM database is queried to identify an address of a third ENUM database that is operated by the second network carrier in response to not finding any entry for the second user terminal in the first ENUM database (block 605). The identified address is then used to query the third ENUM database in response to not finding any entry for the second user terminal in the first ENUM database (block 610). Routing information is then received for the non-IMS message from the third ENUM database in response to the query to the third ENUM database (block 615).

Figure 11:
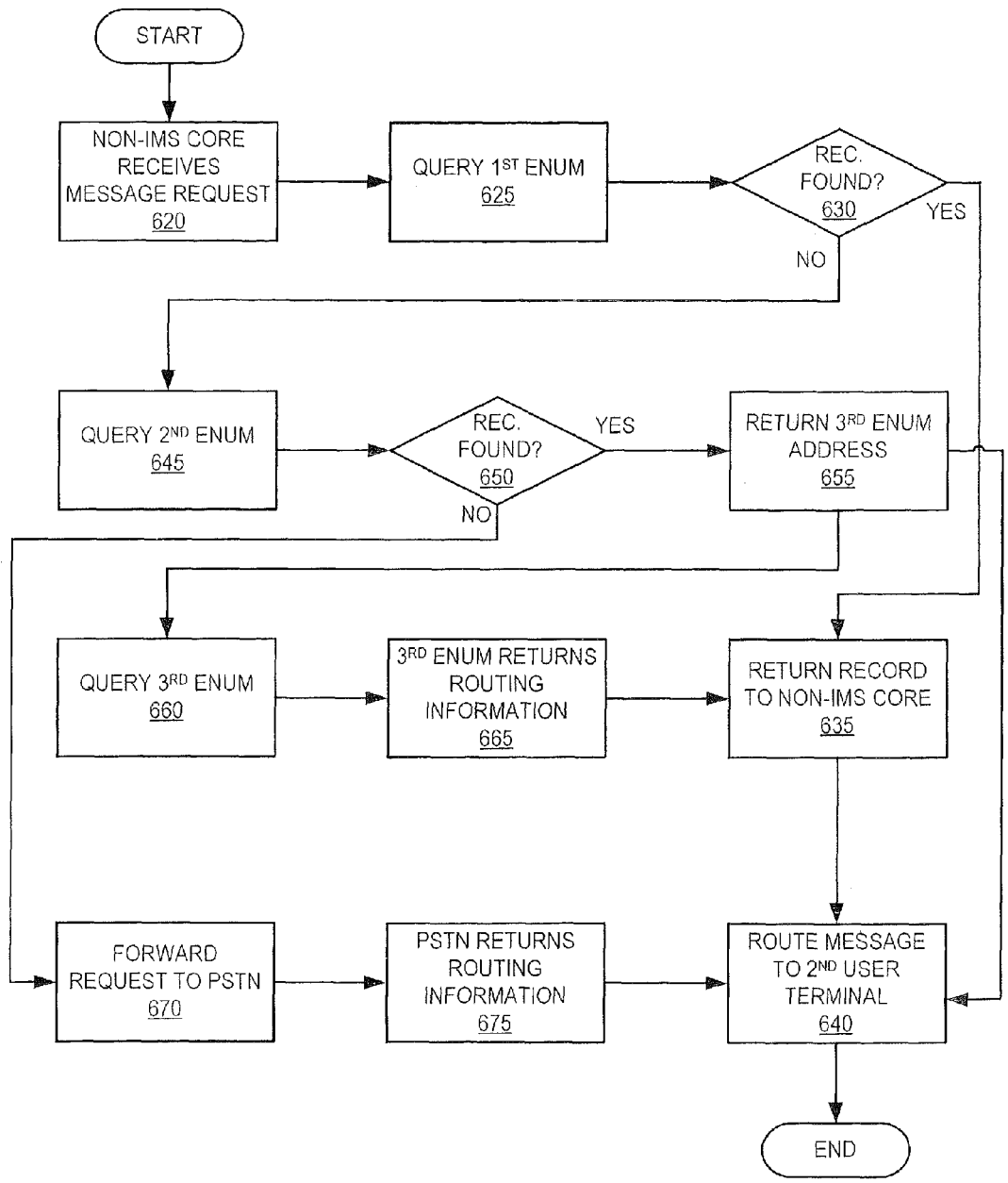

FIG. 11 illustrates methods according to further embodiments of routing non-IMS messages from a first user that has telecommunications service provided by a first network carrier to a second user. Pursuant to these methods, a request to send a non-IMS message is received at a non-IMS core of a network operated by the first network carrier (block 620). The non-IMS core queries a first, private ENUM database that is maintained by the first network carrier in an effort to locate an entry for the second user terminal (block 625). If an entry for the second user terminal is located in the first ENUM database (block 630), then a NAPTR record is returned by the first ENUM to the non-IMS core that includes routing information for the second user terminal (block 635), and the non-IMS core then facilitates routing the non-IMS message to the second user terminal (block 640).

If instead at block 630 it is determined that the first ENUM database does not include a record for the second user terminal, then the non-IMS core queries a second ENUM database, such as a third party Tier 0/1 ENUM database or a local copy thereof, in an attempt to identify an address of a third ENUM database that is operated by a carrier that provides service to the second user terminal (block 645). If the second ENUM database has information that indicates the carrier that provides service to the second user terminal (block 650), then an address for an ENUM database of that carrier (e.g., the address for a Tier 2* database) is returned to the first ENUM database (block 655). Then, the first ENUM database sends a query to the third ENUM database (block 660), and the third ENUM returns routing information for the second user terminal (block 665). The non-IMS core then facilitates routing the non-IMS message to the second user terminal (block 640).

If instead at block 650 the second ENUM database does not have information regarding the carrier that provides service to the second user terminal, then a request for routing information is forwarded to the public service telephone network (PSTN) (block 670). The PSTN then performs an LNP determination and returns the routing information that is obtained thereby (block 675). The non-IMS core then facilitates routing the non-IMS message to the second user terminal (block 640).

Accordingly, pursuant to the methods and systems disclosed herein, both intra-carrier and inter-carrier non-IMS communications, such as SMS and MMS messages, may be routed using a common ENUM architecture, to both IP-based endpoints and to endpoints within the PSTN. The common ENUM architecture may reduce the need to rely on third party Tier 2 ENUM service providers, may reduce the number of ENUM/routing databases that need to be maintained by a carrier, may reduce the need to update third party ENUM databases, and may reduce the cost of operating a communication network while improving the performance thereof.

Embodiments may take the form of an entirely hardware embodiment, an entirely software embodiment or an embodiment combining software and hardware aspects. Computer program code for carrying out operations of systems described above may be written in a high-level programming language, such as C or C++, for development convenience. In addition, computer program code for carrying out operations of embodiments may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary embodiments may take the form of systems, methods, and/or computer program products. Accordingly, exemplary embodiments may be embodied in hardware and/or in software (including firmware, resident software, microcode, etc.). Furthermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable storage medium may be any tangible medium that can store the program for use by or in connection with the instruction execution system, apparatus, or device.

Figure 12:
FIG. 12 illustrates storage media in which computer program products according to some embodiments can be embodied.

The computer-usable or computer-readable medium may be, for example but not limited to, an electronic, magnetic, optical, electromagnetic, or semiconductor system, apparatus, or device. For example, as illustrated in FIG. 12, the computer-readable storage medium may include a random access memory (RAM) 80, a read-only memory (ROM) 82, an erasable programmable read-only memory (EPROM or Flash memory) 84, and/or an optical storage disk 86, such as a CD-ROM, DVD-ROM or DVD-RAM.

Exemplary embodiments are described herein with reference to flowchart and/or block diagram illustrations of methods, systems, and computer program products. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of routing a non-IP multimedia subsystem message from a first user terminal that has telecommunications service provided by a first network carrier to a second user terminal that has telecommunications service provided by a second network carrier, the method comprising:
    searching a first telephone number mapping database for an entry for the second user terminal;
    querying a second telephone number mapping database that is operated by the second network carrier in response to not finding any entry for the second user terminal in the first telephone number mapping database;
    receiving routing information for routing the non-IP multimedia subsystem message to a network entry point within a network operated by the second network carrier in response to the query to the second telephone number mapping database; and
    routing the non-IP multimedia subsystem message to the network entry point within the network operated by the second network carrier using the routing information provided by the second telephone number mapping database.

2. The method of claim 1, further comprising querying a third telephone number mapping database to obtain an address for the second telephone number mapping database, wherein the third telephone number mapping database is a local copy of a telephone number mapping database that includes telephone number mapping data for multiple carriers and that is maintained by a third party that is independent of both the first network carrier and the second network carrier.

3. The method of claim 1, wherein the first telephone number mapping database comprises a private database that is not accessible to the second network carrier.

4. The method of claim 1, further comprising providing some of the routing information that is received from the second telephone number mapping database to a non-IP multimedia subsystem core.

5. The method of claim 1, wherein the non-IP multimedia subsystem message comprises a Short Message Service or Multimedia Message Service message.

6. The method of claim 1, further comprising routing the non-IP multimedia subsystem message based on the routing information received from the second telephone number mapping database.

7. The method of claim 1, wherein the second user terminal comprises an analog telephone connected to a public switched telephone network.

8. A communications system, comprising:
   an IP multimedia system core to manage voice over IP communications sessions;
   a non-IP multimedia subsystem core to manage Short Message Service and Multimedia Message Service communications;
   a private telephone number mapping database that is responsive to queries from both the IP multimedia subsystem core and the non-IP multimedia subsystem core, the private telephone number mapping database containing records that include complete routing information for subscriber terminals within the communications system for both IP multimedia subsystem and non-IP multimedia subsystem communications;
   a second telephone number mapping database; and
   a network entry point to receive a non-IP multimedia subsystem message that is forwarded from outside the communications network to a subscriber terminal within the communications system, wherein the routing information in the second telephone number mapping database comprises routing information to the network entry point.

9. The communications system of claim 8, wherein the communications system comprises a converged communications network that is operated by a single communications service provider and that includes first and second communications subsystems, and wherein the private telephone number mapping includes routing information for routing a non-IP multimedia subsystem message from a first subscriber terminal that is part of the first communications subsystem to a second subscriber terminal that is part of the second communications subsystem.

10. The communications system of claim 8, wherein the second telephone number mapping database contains records that include limited routing information for subscriber terminals within the communications system.

11. The communications system of claim 8, further comprising a local copy of a third telephone number mapping database that includes routing information for terminals located outside the communications system.

* * * * *